US011263453B2

(12) United States Patent
Xiong et al.

(10) Patent No.: US 11,263,453 B2
(45) Date of Patent: Mar. 1, 2022

(54) METHOD AND SYSTEM FOR TRACKING AND DISPLAYING OBJECT TRAJECTORY

(71) Applicant: UBTECH ROBOTICS CORP LTD, Shenzhen (CN)

(72) Inventors: Youjun Xiong, Shenzhen (CN); Liangliang Jia, Shenzhen (CN)

(73) Assignee: UBTECH ROBOTICS CORP LTD, Shenzhen (CN)

(*) Notice: Subject to any disclaimer, the term of this patent is extended or adjusted under 35 U.S.C. 154(b) by 238 days.

(21) Appl. No.: 16/611,476

(22) PCT Filed: Dec. 27, 2018

(86) PCT No.: PCT/CN2018/124408
§ 371 (c)(1),
(2) Date: Nov. 6, 2019

(87) PCT Pub. No.: WO2020/133079
PCT Pub. Date: Jul. 2, 2020

(65) Prior Publication Data
US 2021/0334534 A1      Oct. 28, 2021

(51) Int. Cl.
| G06K 9/00 | (2006.01) |
| H04W 4/029 | (2018.01) |
| G01S 17/06 | (2006.01) |
| G06T 7/20 | (2017.01) |
| H04W 4/02 | (2018.01) |

(52) U.S. Cl.
CPC .......... *G06K 9/00624* (2013.01); *G01S 17/06* (2013.01); *G06T 7/20* (2013.01); *H04W 4/023* (2013.01); *H04W 4/029* (2018.02)

(58) Field of Classification Search
CPC ... G06K 9/00624; G01S 17/06; H04W 4/029; H04W 4/023; G06T 7/20

USPC .......................................................... 382/103
See application file for complete search history.

(56) References Cited

U.S. PATENT DOCUMENTS

| 2014/0149070 A1* | 5/2014 | Cheng | G06K 9/00335 |
| | | | 702/150 |
| 2016/0183059 A1* | 6/2016 | Nagy | H04B 17/318 |
| | | | 455/456.5 |

FOREIGN PATENT DOCUMENTS

CN         106405493 A       2/2017

OTHER PUBLICATIONS

ISR for PCT/CN2018/124408.
Written opinions of ISA for PCT/CN2018/124408.

* cited by examiner

*Primary Examiner* — Ayodeji O Ayotunde (57) ABSTRACT

The present disclosure relates to an object trajectory tracking and displaying method, comprising the following steps of: creating a mapping relationship database of image features and WIFI information for objects in a distributed search server, where each WIFI information includes position information; receiving a trajectory query request for a monitored object; searching the mapping relationship database of image features and WIFI information for objects according to an image feature of the monitored object to produce a WIFI information set, and producing a corresponding position information set based on the WIFI information set; and generating real-time trajectory information of the monitored object based on the position information set. The object trajectory tracking and displaying method and system of the present disclosure make the position of the sampling data points more accurate and improve the accuracy of trajectory querying.

20 Claims, 8 Drawing Sheets

METHOD AND SYSTEM FOR TRACKING AND DISPLAYING OBJECT TRAJECTORY

BACKGROUND

1. Technical Field

The present disclosure relates to cloud computing technology, and particularly to a method and system for tracking and displaying object trajectory.

2. Description of Related Art

With the development of artificial intelligence and computer software and hardware technology, the security arming system based on image processing has been rapidly developed for its intuitive, convenient, and wide content, and is widely used in many public security fields. With the promotion of video surveillance systems, the case detection rate and public safety index can be effectively improved.

In order to realize public safety monitoring, it is necessary to query the motion trajectory of the monitored object or the arming object.

For the potential arming object, since it does not hold a tracking device, the trajectory tracking is generally performed by using the image feature of the arming object in the prior art. In the case that the image feature of the object can be collected, the current position information of a pedestrian can be displayed on a map of a requesting terminal based on position information of an image collecting device.

However, if it tracks only by relying on collecting the image feature of the arming object and the location of the image collecting device, there will be a large blind zone in the public area. In this blind zone, the image collecting device cannot obtain image feature data of the object and cannot obtain position information of the monitored object or the arming object, hence the trajectory of the monitored object or the arming object cannot be updated in real time on the requesting terminal, and the trajectory of the monitored object or the arming object cannot be displayed on the map of the requesting terminal in real time. Therefore, the existing security arming system has a large t trajectory tracking error on the monitored object and the arming object.

In the case that a security arming system displays a patrol track of a patrolling police, the current location of the patrolling police is required to be displayed on the interface of the requesting terminal in real time. However, in the existing security arming system, since it only uses an image feature collecting device of a single object as a position information sampling point, the image feature data of the patrol police cannot be collected in the collection blind zone of the image feature collecting device of the patrolling police, and the location data of the patrolling police cannot be obtained, so the real-time trajectory of the patrolling police cannot be accurately displayed.

Therefore, the existing object trajectory tracking technology still needs to be improved and developed.

SUMMARY

In response to the above-mentioned technical problems, the present disclosure provides detailed latitude and longitude position information generated by connecting a network through a WIFI device of an object, and associates the image feature of the object with the WIFI device and creates a mapping relationship database of image features and WIFI information. By searching a position information set of the object in the mapping relationship database which is updated in real time, the position of sampling data points can be more precise, thereby providing an object trajectory tracking and displaying method and system which have higher trajectory query accuracy.

In a first aspect, the technical solution provided by the embodiments of the present disclosure is to provide an object trajectory tracking and displaying method, which includes the following steps:

creating a mapping relationship database of image features and WIFI information for objects in a distributed search server, where each WIFI information includes position information;

receiving a trajectory query request for a monitored object;

searching the mapping relationship database of image features and WIFI information for objects according to an image feature of the monitored object to produce a WIFI information set, and producing a corresponding position information set based on the WIFI information set; and generating real-time trajectory information of the monitored object based on the position information set.

In an embodiment of advanced search, the step of generating the real-time trajectory information of the monitored object based on the position information set includes:

obtaining a query condition; and analyzing the position information set based on the query condition, generating depth trajectory information of the monitored object meeting the query condition, and transmitting the deep real-time trajectory information to a requesting terminal.

In an embodiment of message subscription, the step of generating the real-time trajectory information of the monitored object based on the position information set includes:

receiving the position information set in real time, setting a buffer stack of the real-time position information set, and transmitting the position information queued in the buffer stack to a requesting terminal in a first-in first-out manner based a message system; and displaying, through the requesting terminal, a real-time trajectory of the monitored object on a local map module based on the position information of the monitored object received in real time.

In order to improve the diversity of the trajectory estimation service, before the step of receiving the trajectory query request for the monitored object further includes:

registering, through the requesting terminal, to a distributed central server to determine a registered service category; and obtaining, through the requesting terminal, the position information set corresponding to the registered service category from the distributed central server based on the registered service category of the requesting terminal.

In order to increase the data volume of the database to further improve the trajectory accuracy, further including updating the mapping relationship database of image features and WIFI information for objects in real time.

In a specific implementation, the step of updating the mapping relationship database of image features and WIFI information for objects in real time further includes:

collecting, through an information collecting device, an image feature and WIFI information of an unspecified object;

cleaning the image feature and the WIFI information of the unspecified object; and indexing the cleaned image feature and the associated WIFI information to the distributed search server.

In which, the step of the step of cleaning the image feature and the WIFI information of the unspecified object includes:

determining whether an associated mapping relationship can be established between the collected image feature and WIFI information of the unspecified object through a collision analysis, and deleting the collected image feature and WIFI information of the unspecified object in response to the associated mapping relationship cannot be established; and determining whether the collected WIFI information of the unspecified object comprises position information being latitude and longitude position information, and deleting the collected image feature and WIFI information of the unspecified object in response to the WIFI information not comprising the position information.

Furthermore, in an embodiment of message subscription, collecting, through an information collecting device, an image feature and WIFI information of a specified object;

searching the mapping relationship database of image features and WIFI information, and intercepting the WIFI information matching the image feature of the specific object; and transmitting the WIFI information to the buffer stack and transmitting the position information queued in the buffer stack to the requesting terminal in the first-in first-out manner based the message system.

In a second aspect, the embodiments of the present disclosure further provides an object trajectory tracking and displaying system, including a trajectory tracking server and a distributed search server for a requesting terminal to access the trajectory tracking server and the distributed search server, where each of the trajectory tracking server and the distributed search server comprises at least one processor and a storage and a communication component communicatively coupled to the at least one processor; and the storage stores instructions executable by the at least one processor, and a data channel is created through the communication component when the instructions are executed by the at least one processor to cause the at least one processor to execute the above-mentioned method.

In a third aspect, the embodiments of the present disclosure further provides a computer program product including a computer program stored in a non-transitory computer readable storage medium, wherein the computer program comprises program instructions, a computer is caused to perform the above-mentioned method when the program instruction is executed by the computer.

The beneficial effects of the embodiments of the present disclosure are as follows. In the embodiments of the object trajectory tracking and displaying method and system, except that the trajectory of the monitored object or the arming object is described according to the image feature of the object, by using the latitude and longitude position information generated by connecting the network through the WIFI device of the object, the image feature of the object is associated with the WIFI device and the mapping relationship database is created for the trajectory query to generate the trajectory information of the monitored object or the arming object. In the embodiments of the object trajectory tracking and displaying method and system, the image feature of the object and the position information generated by connecting the network through the WIFI device are simultaneously used as the sampling data points for describing the trajectory of the object, so that the position of the sampled data points for describing the trajectory can be more accurate, thereby improving the accuracy of the query of the trajectory of the object, while the monotonicity when only the image feature data of the object is used to describe the trajectory can be avoided.

BRIEF DESCRIPTION OF THE DRAWINGS

There are one or more embodiments to be exemplarily described by the figures in the drawings. The exemplarily descriptions do not constitute a limitation to the embodiments. Elements in the drawings that have the same reference numerals indicate similar elements, and the figures in the drawings do not constitute a scale limitation unless specifically stated.

DETAILED DESCRIPTION

In order to make the objectives, the technical solutions, and the advantages of the embodiments of the present disclosure more clearly, the embodiments of the present disclosure will be further described in detail below with reference to the drawings. Herein, the exemplary embodiments of the present disclosure and their descriptions are for explaining the present disclosure and are not intended to limit the present disclosure.

Figure 1:
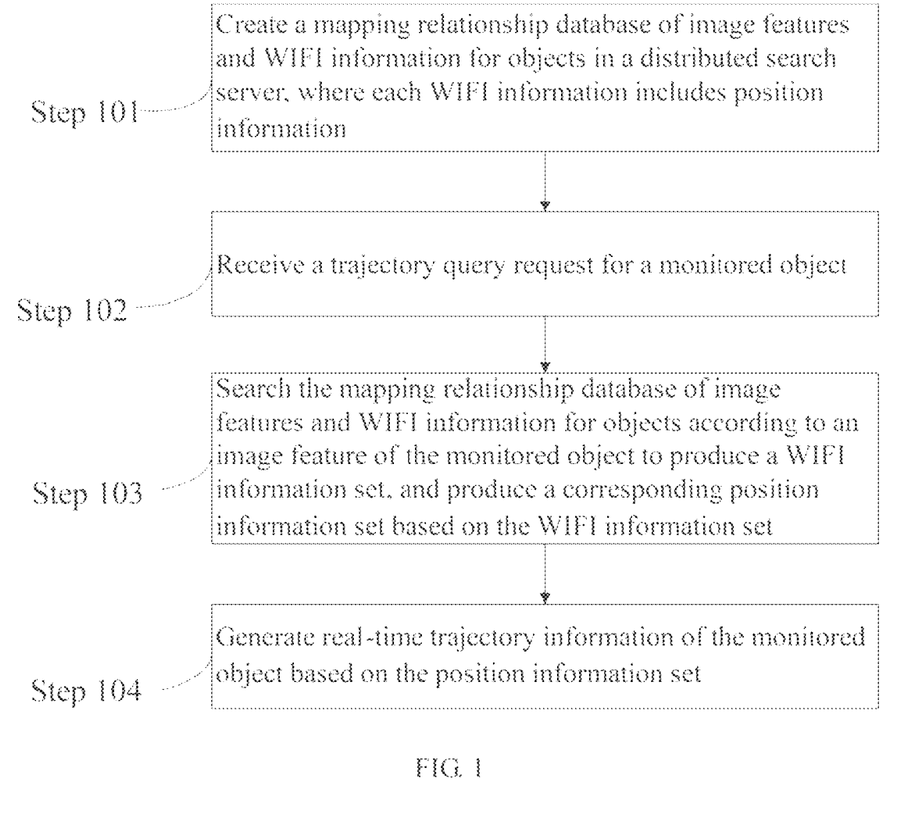
FIG. 1 is a flow chart of a main process of an object trajectory tracking and displaying method according to an embodiment of the present disclosure.

As shown in FIG. 1, the present disclosure relates to an object trajectory tracking and displaying method and system.

In this embodiment, the object trajectory tracking and displaying method mainly includes the following steps: creating a mapping relationship database of image features and WIFI information for objects in a distributed search server, where each WIFI information includes position information; receiving a trajectory query request for a monitored object; searching the mapping relationship database of image features and WIFI information for objects according to an image feature of the monitored object to produce a WIFI information set, and producing a corresponding position information set based on the WIFI information set; and generating real-time trajectory information of the monitored object based on the position information set.

In this embodiment, the object trajectory tracking and displaying method and system adopts two modes when displaying the trajectory of the monitored object in response to the request of the requesting terminal, one is an advanced search mode, and the other is a message subscription mode.

In the message subscription mode, the object trajectory tracking and displaying method and system of this embodiment establish a one-to-one mapping relationship between the image feature and the WIFI information of the object. In addition, the image feature of the object collected in real time, the position information of the information collecting device and the WIFI information are all transmitted to a message system of a trajectory tracking server, so that the requesting terminal receives geographical position information of the monitored object in real time through a message subscription service, and the track of the monitored object is displayed on a map of the requesting terminal in real time according to the position information.

In an embodiment of message subscriber, the image feature and the WIFI information of the object are transmitted to a buffer stack of the message system of the trajectory tracking server, and the requesting terminal obtains the position information set of the object with the image feature in real time through the subscribed messages, thereby displaying the track of the monitored object on the map of the requesting terminal in real time.

In the advanced search mode, the collected image feature and WIFI information data (where the WIFI information includes position information) of the object are indexed into a distributed search server cluster. The distributed search server cluster provides an advanced query module which can perform searching in the period and area agreed upon by the query condition according to a query condition proposed by the requesting terminal. For another example, the advanced query module can also query the walking trajectory of the monitored object during a certain period.

The image feature and the WIFI information of the object are associated with each other and a one-to-one correspondence mapping relationship is established by using a collision analysis. For example, after performing the collision analysis in multiple areas, if it is found that the image feature and the WIFI information of the object appear at the same time, it is considered as the image feature and the corresponding WIFI device of the same object, and the associated mapping relationship can be established. The distributed search server is based on the mapping relationship database, it realizes the advanced trajectory query under the query condition of the requesting terminal using the image features and WIFI information of the object that are obtained in real time by an index information collecting device. In the public security monitoring, the distributed search server may also query the walking track of the arming object during a certain period, and use the position information generated by the image feature and the position information of the object, so that the position information of the position sampling point describing the track of the object can be more accurate.

In the object trajectory tracking and displaying method and system of this embodiment, except that the trajectory of the monitored object or the arming object is described according to the image feature of the object, by using the latitude and longitude position information generated by connecting the network through the WIFI device of the object, the image feature of the object is associated with the WIFI device and the mapping relationship database is created for the trajectory query to generate the trajectory information of the monitored object or the arming object. In the object trajectory tracking and displaying method and system of this embodiment, the image feature of the object and the position information generated by connecting the network through the WIFI device are simultaneously used as the sampling data points for describing the trajectory of the object, so that the position of the sampled data points for describing the trajectory can be more accurate, thereby improving the accuracy of the query of the trajectory of the object, while the monotonicity when only the image feature data of the object is used to describe the trajectory can be avoided.

Specific Embodiments

Figure 6:
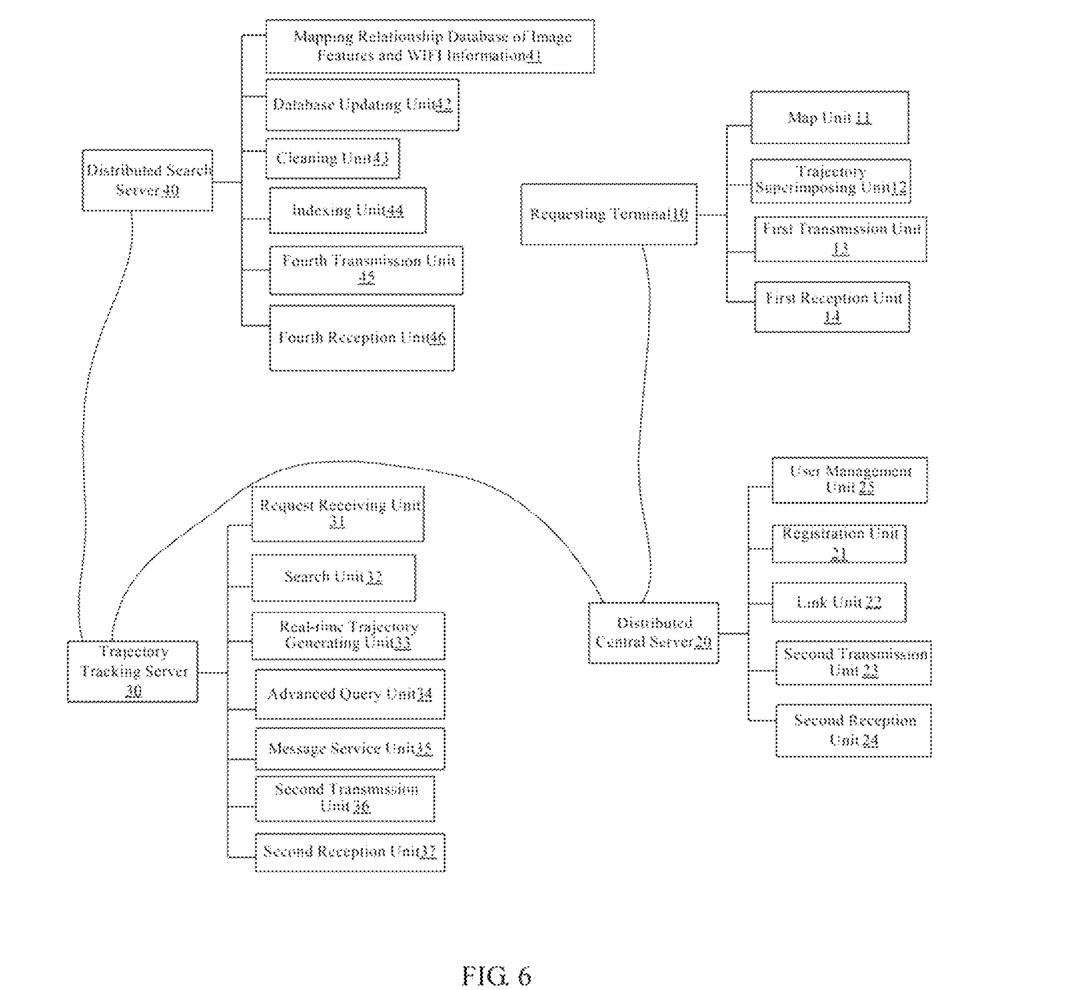
FIG. 6 is a structural diagram of the a system module of an object trajectory tracking and displaying system according to an embodiment of the present disclosure.

Please refer to FIG. 6, a structural diagram of a system module of an object trajectory tracking and displaying system of the present disclosure is provided. The object trajectory tracking and displaying method is realized by the system.

The object trajectory tracking and displaying system includes a requesting terminal 10, a distributed central server 20, a trajectory tracking server 30, and a distributed search server 40.

The trajectory tracking server 30 is a distributed trajectory tracking server cluster. By modifying the address of the service node in real time at the central server, the dynamically expanding of the amount of trajectory query service nodes can be realized on the side of the trajectory tracking server.

The distributed search server 40 is a distributed search server cluster. The storage node of the distributed search server can also be dynamically expanded, so as to improve the storage concurrency of the mapping relationship database.

In this embodiment, the requesting terminal can be an advanced management user, or be a registered user, or a robot terminal.

In order to implement data interaction and real-time trajectory display, the requesting terminal 10 includes a map unit 11, a trajectory superimposing unit 12, a first transmission unit 13, and a first reception unit 14.

The map unit 11 is configured to display a map locally. The trajectory superimposing unit 12 is configured to superimpose the trajectory of the monitored object on the map according to the position information set which fed back by the trajectory tracking server. The first transmission unit 13 and the first reception unit 14 are configured to transmit data to and receive data with respect to the central server.

The distributed central server 20 includes a registration unit 21, a link unit 22, a second transmission unit 23, a second reception unit 24, and a user management unit 25.

The registration unit 21 is configured to register the requesting terminal such as an advanced management user, a registered user, or a robot terminal, and to determine a registered service category of the registered requesting terminal. The link unit 22 is configured to assign a service node address to the requesting terminal. The second transmission unit 23 and the second reception unit 24 are configured to perform the data interaction with the requesting terminal and perform the data interaction with the trajectory tracking server. The user management unit 25 is configured to manage the registered requesting terminals such as performing member management.

The trajectory tracking server 30 includes a request receiving unit 31, a search unit 32, a real-time trajectory generating unit 33, an advanced query unit 34, a message service unit 35, a second transmission unit 36, and a second reception unit 37.

The request receiving unit 31 is configured to receive a position information search task allocated by the central server. The searching unit 32 is configured to search the position information set from the mapping relationship database of image features and WIFI information of the object according to the query condition. The real-time trajectory generating unit 33 is configured to generate trajectory information of the monitored object based on the position information set. The advanced query unit 34 is configured to provide deep trajectory analysis and tracking services to the advanced management user. The message service unit 35 is configured to provide real-time trajectory tracking of the monitored object to the message subscriber. The second transmission unit 36 and the second reception unit 37 are configured to realize the data interaction with the central server and realize the data interaction with the mapping relationship database of the distributed search server.

The distributed search server 40 includes a mapping relationship database of image features and WIFI information 41, a database updating unit 42, a cleaning unit 43, an indexing unit 44, a fourth transmission unit 45, and a fourth reception unit 46.

The mapping relationship database of image features and WIFI information 41 is configured to dynamically store the mapping relationship data of image features and WIFI information in real time. The database updating unit 42 is coupled to the cleaning unit, and is configured to receive the mapping relationship data of image features and WIFI information that is updated by the information collecting device. The cleaning unit 43 is configured to clean the mapping relationship data of image features and WIFI information that is obtained by the information collecting device. The indexing unit 44 is configured to index the cleaned mapping relationship data of image features and the WIFI information to the database. The fourth transmission unit 45 and the fourth reception unit 46 are configured to realize the data interaction with the information collecting device and realize the data interaction with the trajectory tracking server.

In this embodiment, the object trajectory tracking and displaying system performs data cleaning on the image feature and WIFI information of the object and transmits to the mapping relationship database of the distributed search server for storage, so as to improve data utilization and trajectory generation efficiency.

When the requesting terminal obtains a trajectory of a tracking object by using the message subscription manner, it searches and intercepts the corresponding position information set from the mapping relationship database based on the image feature of the tracking object, and transmits the real-time collected position information to the message system of the trajectory tracking server. The requesting terminal receives the geographical position information of the monitored object in real time through the message subscription service, and displays the trajectory of the monitored object on the map of the requesting terminal in real time according to the position information.

At the same time, the image feature and the corresponding position information of the object that are collected by the information collecting device are also transmitted to the message queue of the buffer stack of the distributed search server after data cleaning. The message module of the requesting terminal subscribes the image features and WIFI information of the tracking object of the message system in the trajectory tracking server in real time, and displays on the map of the requesting terminal in real time according to the image feature of the object and the latitude and longitude information of the WIFI device.

When the requesting terminal obtains a trajectory of a tracking object in the message subscription manner, the collected image feature and the WIFI information data of the object (where the WIFI information includes position information) are indexed into the distributed search server cluster. The distributed search server cluster provides an advanced query module for searching in the period and area agreed upon by the query condition according to the query conditions proposed by the requesting terminal. For another example, the advanced query module can also query the walking trajectory of the monitored object during a certain period.

Figure 2:
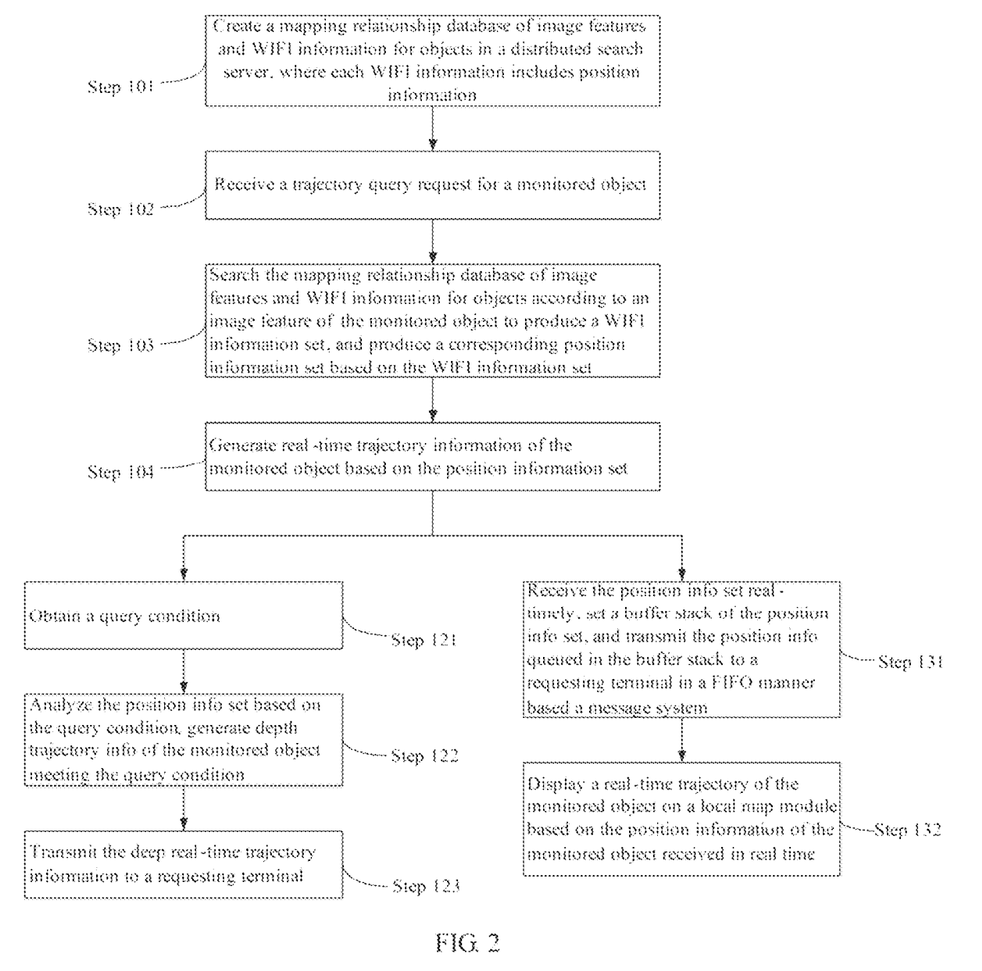
FIG. 2 is a flow chart of a detailed process of an object trajectory tracking and displaying method according to an embodiment of the present disclosure.

Referring to FIG. 1 and FIG. 2 together, in this embodiment, the object trajectory tracking and displaying method of mainly includes the following steps:

Step 101: creating a mapping relationship database of image features and WIFI information for objects in a distributed search server, where each WIFI information includes position information;

Step 102: receiving a trajectory query request for a monitored object;

Step 103: searching the mapping relationship database of image features and WIFI information for objects according to an image feature of the monitored object to produce a WIFI information set, and producing a corresponding position information set based on the WIFI information set; and Step 104: generating real-time trajectory information of the monitored object based on the position information set.

In an embodiment of advanced search, the step of generating the real-time trajectory information of the monitored object based on the position information set includes:

Step 121: obtaining a query condition;

Step 122: analyzing the position information set based on the query condition, generating depth trajectory information of the monitored object meeting the query condition; and Step 123: transmitting the deep real-time trajectory information to a requesting terminal.

In an embodiment of message subscription, the step of generating the real-time trajectory information of the monitored object based on the position information set includes:

Step 131: receiving the position information set in real time, setting a buffer stack of the real-time position information set, and transmitting the position information queued in the buffer stack to a requesting terminal in a first-in first-out manner based a message system; and Step 132: displaying, through the requesting terminal, a real-time trajectory of the monitored object on a local map module based on the position information of the monitored object received in real time.

Figure 3:
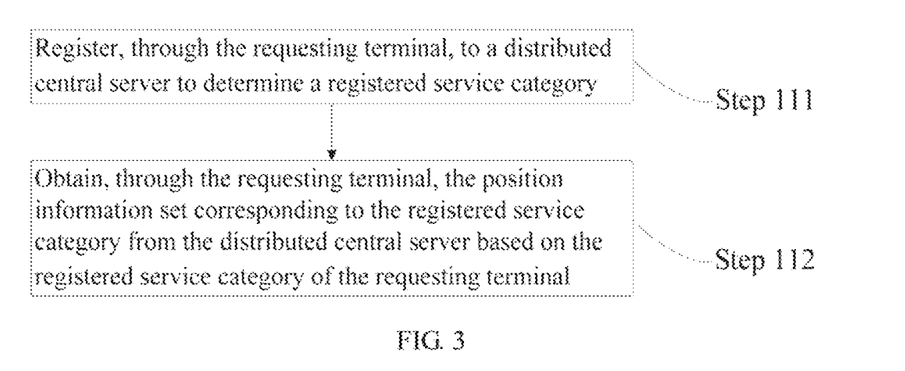
FIG. 3 is a flow chart showing a registration process of a request terminal in an object trajectory tracking and displaying method according to an embodiment of the present disclosure.

Referring to FIG. 3, in order to provide a variety of trajectory estimation services, the central server divides the trajectory tracking service into multiple service categories, and provides a personalized trajectory tracking service according to the registered service category of the requesting terminal. Therefore, the object trajectory tracking and displaying method further includes:

Step 111: registering, through the requesting terminal, to a distributed central server to determine a registered service category; and Step 112: obtaining, through the requesting terminal, the position information set corresponding to the registered service category from the distributed central server based on the registered service category of the requesting terminal.

In this embodiment, in order to increase the data volume of the database to further improve the trajectory accuracy, the mapping relationship database of image features and WIFI information needs to be updated in real time.

Figure 5:
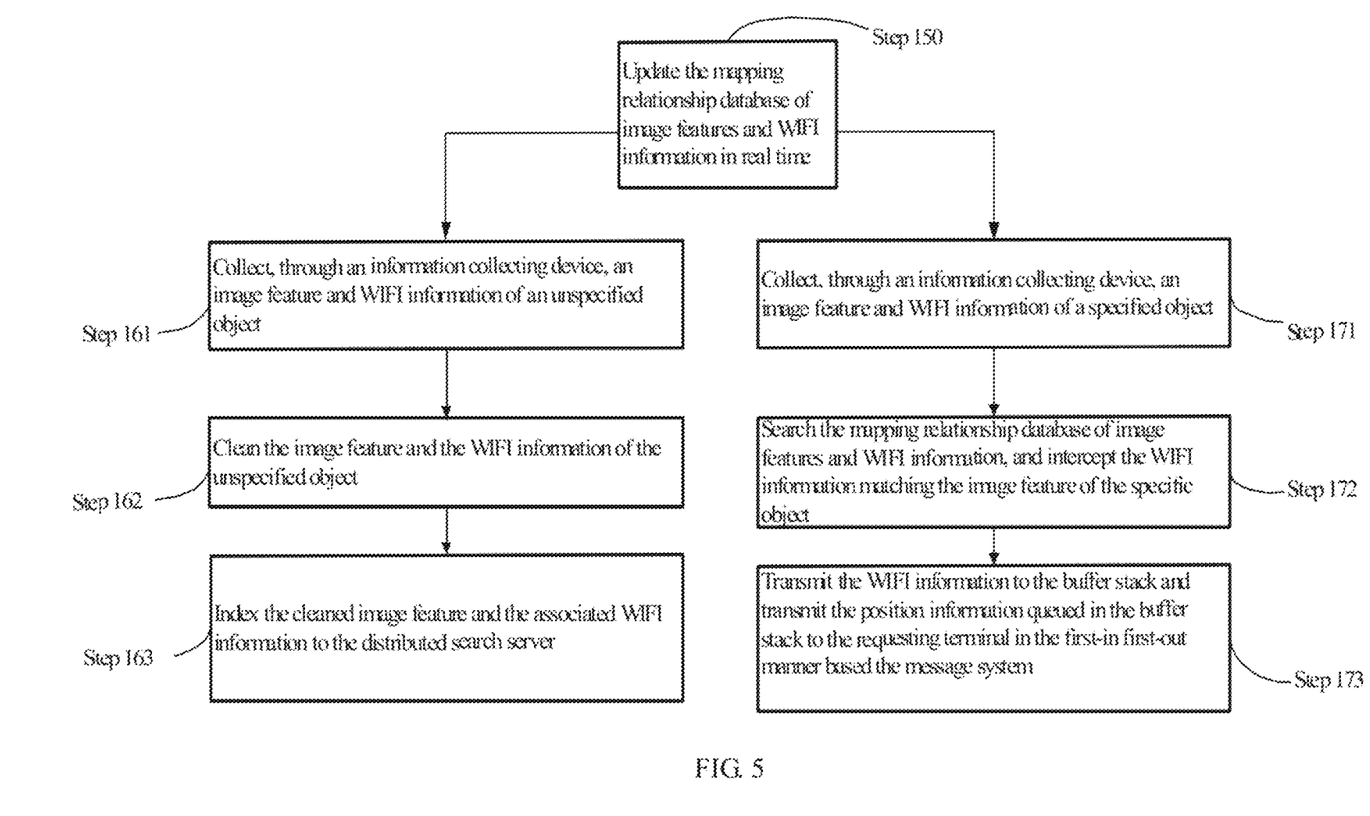
FIG. 5 is a flow chart showing a database updating process in an object trajectory tracking and displaying method according to an embodiment of the present disclosure.

Referring to FIG. 5, in the specific implementation, the step of updating the image feature and the WIFI information mapping relationship in real time includes:

Step 150: updating the mapping relationship database of image features and WIFI information in real time.

Step 161: collecting, through an information collecting device, an image feature and WIFI information of an unspecified object;

Step 162: cleaning the image feature and the WIFI information of the unspecified object; and Step 163: indexing the cleaned image feature and the associated WIFI information to the distributed search server.

In an embodiment of message subscription, in order to update the mapping relationship database of image features and WIFI information in real time, the following steps are also included:

Step 171: collecting, through an information collecting device, an image feature and WIFI information of a specified object;

Step 172: searching the mapping relationship database of image features and WIFI information, and intercepting the WIFI information matching the image feature of the specific object; and Step 173: transmitting the WIFI information to the buffer stack and transmitting the position information queued in the buffer stack to the requesting terminal in the first-in first-out manner based the message system.

Figure 4:
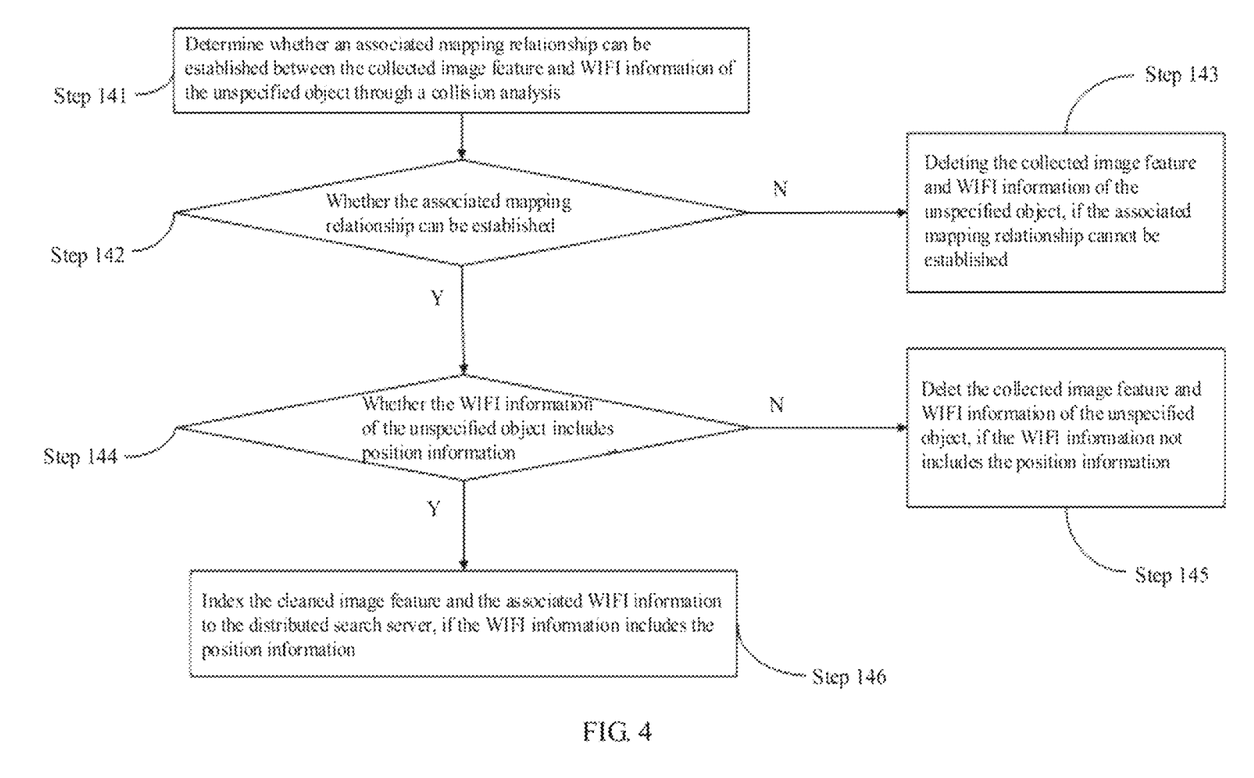
FIG. 4 is a flow chart showing a data cleaning process in an object trajectory tracking and displaying method according to an embodiment of the present disclosure.

As shown in FIG. 4, the step of cleaning the image feature and the WIFI information of the specific or unspecified object includes:

Step 141: determining whether an associated mapping relationship can be established between the collected image feature and WIFI information of the unspecified object through a collision analysis;

Step 142: determining whether the associated mapping relationship can be established.

Step 143: deleting the collected image feature and WIFI information of the unspecified object, if the associated mapping relationship cannot be established;

Step 144: determining whether the collected WIFI information of the unspecified object includes position information that is latitude and longitude position information, if the associated mapping relationship can be established;

Step 145: deleting the collected image feature and WIFI information of the unspecified object, if the WIFI information not includes the position information;

Step 146: indexing the cleaned image feature and the associated WIFI information to the distributed search server, if the WIFI information includes the position information.

Figure 7:
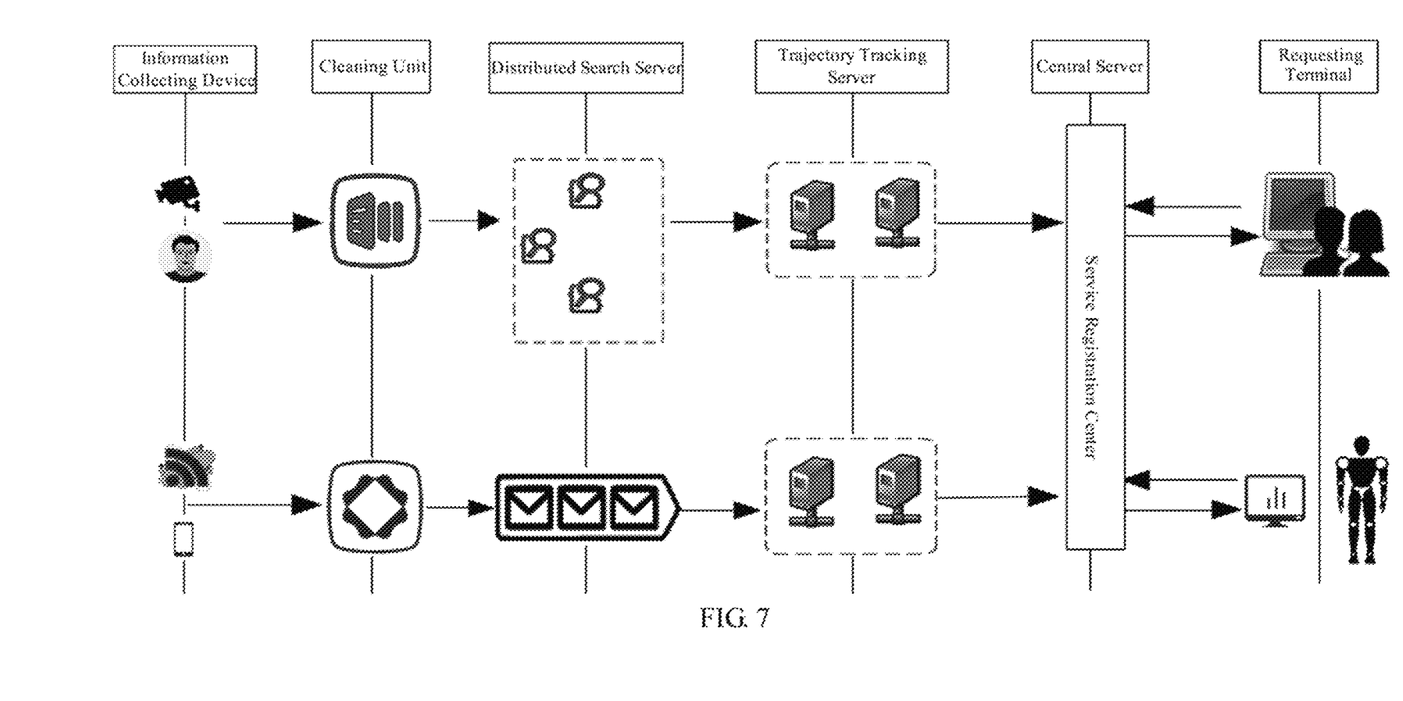
FIG. 7 is a block diagram of the operation framework of an object trajectory tracking and displaying system according to an embodiment of the present disclosure.

Please refer to FIG. 7, the operation process of the object trajectory tracking and displaying system will be introduced as follows.

In a message subscription mode, the requesting terminal transmits a trajectory request for a specific monitored object to the central server. The trajectory tracking server queries the image feature and WIFI information of the monitored object, and queries the waling trajectory data of the monitored object during a certain period in the mapping relationship database of the distributed search server.

The requesting terminal performs the trajectory query according to the registered service category registered to the central server. The central server provides the address of the service node of the trajectory tracking server, and queries the image feature and WIFI information of the monitored object in the mapping relationship database of the distributed search server.

The distributed search server transmits the image feature data and WIFI information of the searched or recognized monitored object to the message system of the trajectory tracking server, and the requesting terminal such as a robot sets a map module for obtaining the image feature and WIFI information of the object in real time through the subscribed messages, and displays the motion track of the monitored object in real time on a map of the requesting terminal according to the position information set.

In an advanced search mode, the requesting terminal such as an advanced management user transmits a query condition to the central server to request a trajectory of a specific monitored object. The trajectory tracking server queries the image feature and WIFI information of the monitored object, and searches for the walking trajectory data of the monitored object in the mapping relationship database of the distributed search server according to the query condition.

After the advanced management user issues the trajectory query request, the central server provides the address of the service node of the trajectory tracking server, and queries the image feature and WIFI information of the monitored object according to the area and the period in the query condition in the mapping relationship database of the distributed search server, and returns the trajectory information of the monitored object to the request terminal making the request.

In the object trajectory tracking and displaying method and system of this embodiment, except that the trajectory of the monitored object or the arming object is described according to the image feature of the object, by using the latitude and longitude position information generated by connecting the network through the WIFI device of the object, the image feature of the object is associated with the WIFI device and the mapping relationship database is created for the trajectory query to generate the trajectory information of the monitored object or the arming object. In the object trajectory tracking and displaying method and system of this embodiment, the image feature of the object and the position information generated by connecting the network through the WIFI device are simultaneously used as the sampling data points for describing the trajectory of the object, so that the position of the sampled data points for describing the trajectory can be more accurate, thereby improving the accuracy of the query of the trajectory of the object, while the monotonicity when only the image feature data of the object is used to describe the trajectory can be avoided.

In this embodiment, the object trajectory tracking and displaying method and system clean the newly collected data to ensure the accuracy of the tracked trajectory when updating the mapping relationship database of the image feature and WIFI information of the object. The image feature data and the WIFI information of the object are comprehensively analyzed to establish an association relationship. In the specific implementation, a collision analysis is performed on the image feature and the WIFI information of the object, and the image features of the object appearing in the same period in multiple areas are associated with the WIFI device information, for example, after performing the collision analysis on the image feature and the WIFI information of the object, if the image feature and WIFI information of the same object are stored in multiple areas, the image feature of the object is considered as associating with the WIFI device, and the image feature and WIFI information of the object are saved in the mapping relationship database.

In object trajectory tracking and displaying method and system of this embodiment, the query service node of the trajectory tracking server can be dynamically expanded to improve the concurrency of the trajectory query. In a specific implementation, the requesting terminal registers to the central server, and the requesting terminal can find the address of the trajectory query service node from a registration center of the central server, and the dynamical expansion of the amount of the trajectory query service node can be realized at the side of the trajectory tracking server by modifying the address of the service node in real time in the central server.

Similarly, the storage node of the distributed search server can also be dynamically expanded to improve the storage concurrency of the mapping relationship database. The distributed search server indexes the image feature and WIFI information of the object into the distributed search server cluster to provide position information query. The distributed search server cluster can provide a trajectory query operation based on the position information to query the track information of the arming objects in the area during a certain period, and the distributed search server cluster can increase the storage and query nodes through dynamic expansion, thereby improving the efficiency of storage and query.

Figure 8:
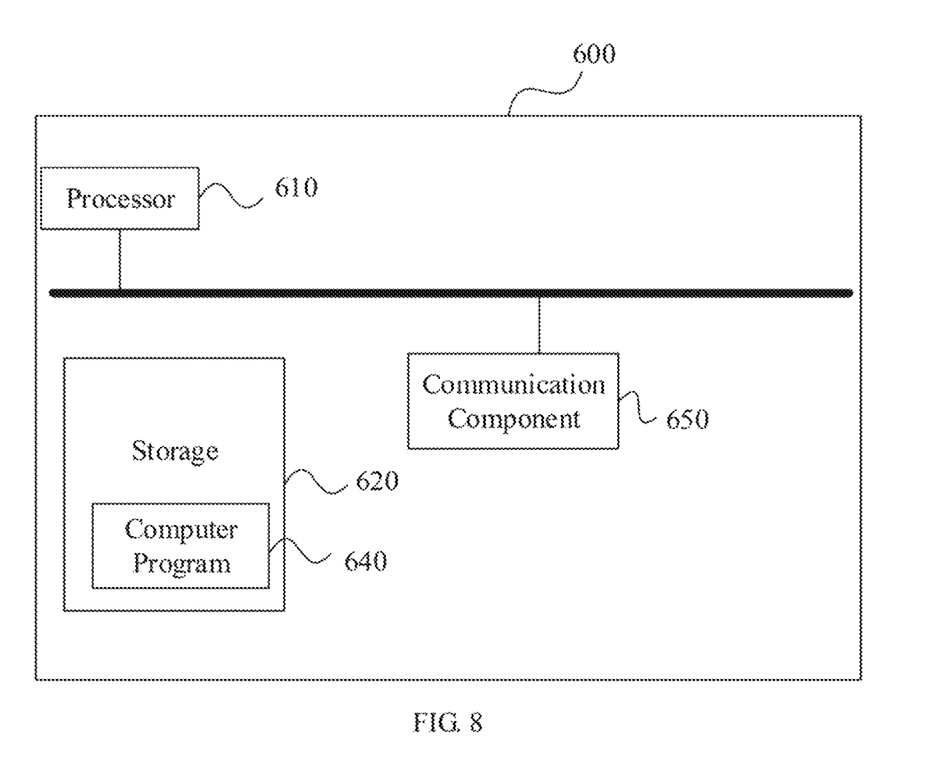
FIG. 8 is a block diagram of the hardware architecture of an apparatus of an object trajectory tracking and displaying system according to an embodiment of the present disclosure.

FIG. 8 is a schematic diagram of a hardware structure of an apparatus of the object trajectory tracking and displaying system according to an embodiment of the present disclosure, for example, an apparatus 600. As shown in FIG. 8, the apparatus 600 includes:

one or more processors 610, a storage 620, and a communication component 650. In FIG. 8, it is exemplified by one processor 610. The storage 620 stores instructions that are executable by the at least one processor 610. When the instructions are executed by the at least one processor, a data channel is established through the communication component 650 to enable the at least one processor to perform the object trajectory tracking and displaying method.

The processor 610, the storage 620, and the communication component 650 can be connected by a bus or other means. In FIG. 8, it is exemplified by a bus connection.

The storage 620 is a non-volatile computer readable storage medium, which can be used for storing non-volatile software programs as well as non-volatile computer executable programs and modules such as the program instructions/modules corresponding to the object trajectory tracking and displaying method in this embodiment. By executing the non-volatile software programs, instructions, and modules stored in the storage 620, the processor 610 executes various functional applications and data processing of a server, that is, realizing the object trajectory tracking and displaying method in the above-mentioned method embodiments.

The storage 620 may include a program storage area and a data storage area, where the program storage area may store an operating system and an application required for at least one function; the data storage area may store data created in the use of the object trajectory tracking and displaying system and the like. Moreover, the storage 620 may include a high speed random access memory, and may also include a non-volatile memory such as at least one magnetic disk storage device, flash memory device, or other non-volatile solid storage device. In some embodiments, storage 620 can optionally include a storage that is remotely disposed with respect to processor 610, which can be connected to the robot via a network. Examples of the above-mentioned network includes, but is not limited to, the Internet, an intranet, a local area network, a mobile communication network, and a combination thereof.

The one or more modules are stored in the storage 620, and execute the object trajectory tracking and displaying method when executed by the one or more processors 610, for example, execute the above-mentioned steps 101-104 in FIG. 1, execute the above-mentioned steps 121-132 in FIG. 2, or execute the above-mentioned steps 141-146 in FIG. 4; or implement the function of all the modules in the distributed search server 40, the trajectory tracking server 30, the distributed central server 20, and the requesting terminal 10 of FIG. 6.

The above-mentioned product can execute the methods provided by the embodiments of the present disclosure, and has the corresponding functional modules and beneficial effects for executing the method. For technical details that are not described in detail in this embodiment, reference may be made to the methods provided by the embodiments of the present disclosure.

Embodiments of the present disclosure provide a non-transitory computer readable storage medium which stores computer executable instructions that are executed by one or more processors so as to, for example, execute the steps 101-104 in FIG. 1, execute the above-mentioned steps 121-132 in FIG. 2, or execute the above-mentioned steps 141-146 in FIG. 4; or implement the function of all the modules in the distributed search server 40, the trajectory tracking server 30, the distributed central server 20, and the requesting terminal 10 of FIG. 6.

Finally, it should be noted that, the above embodiments are only for illustrating the technical solutions of the present disclosure, and are not limitations thereof. Within the idea of the present disclosure, the technical features in the above embodiments or different embodiments may also be combined. The steps may be realized in any order, and there are many other variations of various aspects of the present disclosure as described above which are not provided in the details for the sake of simple and clear. Although the present disclosure has been described in detail with reference to the foregoing embodiments, those skilled in the art should understand that, the technical solutions described in each of the foregoing embodiments may be modified, or some of the technical features may be substituted in the premise of equivalence, while the modifications or substitutions will not make the essence of the corresponding technical solutions deviating from the scope of the technical solution of each of the embodiments of the present disclosure.

What is claimed is:

1. An object trajectory tracking and displaying method, comprising:
creating a mapping relationship database of image features and WIFI information for objects in a distributed search server, wherein each WIFI information comprises position information;
receiving a trajectory query request for a monitored object;
searching the mapping relationship database of image features and WIFI information for objects according to an image feature of the monitored object to produce a WIFI information set, and producing a corresponding position information set based on the WIFI information set; and
generating real-time trajectory information of the monitored object based on the position information set;

wherein the step of generating the real-time trajectory information of the monitored object based on the position information set comprises:

receiving the position information set in real time, setting a buffer stack of the real-time position information set, and transmitting the position information queued in the buffer stack to a requesting, terminal in a first-in first-out manner based a message system: and displaying, through the requesting terminal, a real-time trajectory of the monitored object on a local map module based on the position information of the monitored object received in real time.

2. The method of claim 1, wherein the step of generating the real-time trajectory information of the monitored object based on the position information set comprises:

obtaining a query condition; and analyzing the position information set based on the query condition, generating depth trajectory information of the monitored object meeting the query condition, and transmitting the deep real-time trajectory information to a requesting terminal.

3. The method of claim 1, wherein before the step of receiving the trajectory query request for the monitored object further comprises:

registering, through the requesting terminal, to a distributed central server to determine a registered service category; and obtaining, through the requesting terminal, the position information set corresponding to the registered service category from the distributed central server based on the registered service category of the requesting terminal.

4. The method of claim 1, further comprising updating the mapping relationship database of image features and WIFI information in real time.

5. The method of claim 4, wherein the step of updating the mapping relationship database of image features and WIFI information in real time comprises:

collecting, through an information collecting device, an image feature and WIFE information of an unspecified object;

cleaning the image feature and the WIFI information of the unspecified object; and indexing the cleaned image feature and the associated WEFT information to the distributed search server.

6. The method of claim 5, wherein the step of cleaning the image feature and the WIFI information of the unspecified object comprises:

determining whether an associated mapping relationship can be established between the collected image feature and WIFE information of the unspecified object through a collision analysis, and deleting the collected image feature and WIFI information of the unspecified object in response to the associated mapping relationship cannot be established; and determining whether the collected WIFE information of the unspecified object comprises position information being latitude and longitude position information, and deleting the collected image feature and WIFI information of the unspecified object in response to the WIFI information not comprising the position information.

7. The method of claim 1, further comprising
collecting, through an information collecting device, an image feature and WIFI information of a specified object;

searching the mapping relationship database of image features and WIFI information, and intercepting the WIFI information matching the image feature of the specific object; and transmitting the WIFI information to the buffer stack and transmitting the position information queued in the buffer stack to the requesting terminal in the first-in first-out manner based the message system.

8. An object trajectory tracking and displaying system, comprising a trajectory tracking server and a distributed search server for a requesting terminal to access the trajectory tracking server and the distributed search server, wherein:

each of the trajectory, tracking server and the distributed search server comprises at least one processor and a storage and a communication component communicatively coupled to the at least one processor; and the storage stores instructions executable by the at least one processor, and a data channel is created through the communication component when the instructions are executed by the at least one processor to cause the at least one processor to execute the instructions, wherein the instructions comprise:

instructions for creating a mapping relationship database of image features and WIFI information for objects in a distributed search server, wherein each WIFE information comprises position information;

instructions for receiving a trajectory query request for a monitored object;

instructions for searching the mapping relationship database of image features and WIFI information for objects according to an image feature of the monitored object to produce a WIFI information set, and producing a corresponding position information set based on the WIFI information set; and instructions for generating real-time trajectory information of the monitored object based on the position information set;

wherein the instructions for generating the real-time trajectory information of the monitored object based on the position information set comprise:

instructions for receiving the position information set in real time, setting a buffer stack of the real-time position information set, and transmitting the position information queued in the buffer stack to a requesting terminal in a first-in first-out manner based a message system; and instructions for displaying, through the requesting terminal, a real-time trajectory of the monitored object on a local map module based on the position information of the monitored object received in real time.

9. A computer program product, comprising a computer program stored in a non-transitory computer readable storage medium, wherein the computer program comprises program instructions, a computer is caused to perform an object trajectory tracking and displaying method when the program instruction is executed by the computer, and the method comprises:

creating a mapping relationship database of image features and WIFI information for objects in a distributed search server, wherein each WIFI information comprises position information;

receiving a trajectory query request for a monitored object;

searching the mapping relationship database of image features and WIFI information for objects according to an image feature of the monitored object to produce a WIFI information set, and producing a corresponding position information set based on the WIFI information set; and generating real-time trajectory information of the monitored object based on the position information set, wherein the step of generating the real-time trajectory information of the monitored object based on the position information set comprises:

receiving, the position information set in real time, setting a buffer stack of the real-time position information set, and transmitting the position information queued in the buffer stack to a requesting terminal in a first-in first-out manner based a message system; and displaying, through the requesting terminal, a real-time trajectory of the monitored object on a local map module based on the position information of the monitored object received in real time.

10. The system of claim 8, wherein the instructions for generating the real-time trajectory information of the monitored object based on the position information set comprise:

instructions for obtaining a query condition; and instructions for analyzing the position information set based on the query condition, generating depth trajectory information of the monitored object meeting the query condition, and transmitting the deep real-time trajectory information to a requesting terminal.

11. The system of claim 8, wherein the instructions for further comprises:

instructions for registering, through the requesting terminal, to a distributed central server to determine a registered service category; and instructions for obtaining, through the requesting terminal, the position information set corresponding to the registered service category from the distributed central server based on the registered service category of the requesting terminal.

12. The system of claim 8, wherein the instructions further comprises:

instructions for updating the mapping relationship database of image features and WWI information in real time.

13. The system of claim 12, wherein the instructions for updating the mapping relationship database of image features and WIFI information in real time comprise:

instructions for collecting, through an information collecting device, an image feature and WIFI information of an unspecified object;

instructions for cleaning the image feature and the WIFI information of the unspecified object; and instructions for indexing the cleaned image feature and the associated WIFI information to the distributed search server.

14. The system of claim 13, wherein instructions for cleaning the image feature and the WIFI information of the unspecified object comprise:

instructions for determining whether an associated mapping relationship can be established between the collected image feature and WIFI information of the unspecified objet through a collision analysis, and deleting the collected image feature and WIFI information of the unspecified object in response to the associated mapping relationship cannot be established; and instructions for determining whether the collected WIFI information of the unspecified object comprises position information being latitude and longitude position information, and deleting the collected image feature and WIFI information of the unspecified object in response to the WIFI information not comprising the position information.

15. The system of claim 8, wherein the instructions further comprises:

instructions for collecting, through an information collecting device, an image feature and WIFI information of a specified object;

instructions for searching the mapping relationship database of image features and WIFI information, and intercepting the WIFI information matching the image feature of the specific object; and instructions for transmitting the WIFI information to the buffer stack and transmitting the position information queued in the buffer stack to the requesting terminal in the first-in first-out manner based the message system.

16. The computer program product of claim 9, wherein the step of generating the real-time trajectory information of the monitored object based on the position information set comprises:

obtaining a query condition; and analyzing the position information set based on the query condition, generating depth trajectory information of the monitored object meeting the query condition, and transmitting the deep real-time trajectory information to a requesting terminal.

17. The computer program product of claim 9, wherein before the step of receiving the trajectory query request for the monitored object further comprises;

registering, through the requesting terminal, to a distributed central server to determine a registered service category; and obtaining, through the requesting terminal, the position information set corresponding to the registered service category from the distributed central server based on the registered service category of the requesting terminal.

18. The computer program product of claim 9, wherein the method further comprises updating the mapping relationship database of image features and WIFI information in real time.

19. The computer program product of claim 18, wherein the step of updating the mapping relationship database of image features and WIFI information in real time comprises:

collecting, through an information collecting device, an image feature and WIFI information of an unspecified object;

cleaning the image feature and the WIFI information of the unspecified object; and indexing the cleaned image feature and the associated WIFI information to the distributed search server.

20. The computer program product of claim 19, wherein the step of cleaning the image feature and the WIFI information of the unspecified object comprises:

determining whether an associated mapping relationship can be established between the collected image feature and WIFI information of the unspecified object through a collision analysis, and deleting the collected image feature and WIFI information of the unspecified object in response to the associated mapping relationship cannot be established; and determining whether the collected WIFI information of the unspecified object comprises position information being latitude and longitude position information, and deleting the collected image feature and WIFI information of the unspecified object in response to the WIFI information not comprising the position information.

\* \* \* \* \*